US005770080A

United States Patent [19]
Malone

[11] Patent Number: 5,770,080
[45] Date of Patent: Jun. 23, 1998

[54] AIR CHARGED BACKWASHING BIOCLARIFIER

[76] Inventor: Ronald F. Malone, 3218 Riverwalk Dr., Baton Rouge, La. 70820

[21] Appl. No.: 842,241

[22] Filed: Apr. 23, 1997

[51] Int. Cl.[6] .................................................. C02F 3/06
[52] U.S. Cl. ..................... 210/618; 210/786; 210/151; 210/274; 210/279
[58] Field of Search ................................. 210/618, 739, 210/741, 786, 792–798, 150, 151, 108, 121, 129, 274, 275, 276, 277, 279, 410, 411

[56] References Cited

U.S. PATENT DOCUMENTS

| | | | |
|---|---|---|---|
| 887,069 | 5/1908 | Cotter . | |
| 2,464,707 | 3/1949 | Montgomery et al. | 210/151 |
| 3,154,601 | 10/1964 | Kalinske et al. | 210/150 |
| 3,819,054 | 6/1974 | Long et al. | 210/199 |
| 3,956,128 | 5/1976 | Turner | 210/150 |
| 4,009,099 | 2/1977 | Jeris | 210/151 |
| 4,009,105 | 2/1977 | Jeris | 210/151 |
| 4,036,854 | 7/1977 | Chang | 260/343.2 |
| 4,052,300 | 10/1977 | Mosso | 210/20 |
| 4,198,301 | 4/1980 | Iwatani | 210/274 |
| 4,415,454 | 11/1983 | Fuchs | 210/616 |
| 4,432,721 | 2/1984 | Evans et al. | 261/123 |
| 4,547,286 | 10/1985 | Hsiung | 210/738 |
| 4,566,971 | 1/1986 | Reimann et al. | 210/151 |
| 4,576,718 | 3/1986 | Reischi et al. | 210/616 |
| 4,582,600 | 4/1986 | Atkinson et al. | 210/205 |
| 4,608,181 | 8/1986 | Hsiung et al. | 210/786 |
| 4,743,382 | 5/1988 | Williamson et al. | 210/786 |
| 4,842,744 | 6/1989 | Schade | 210/636 |
| 4,865,734 | 9/1989 | Schulz | 210/279 |
| 4,885,083 | 12/1989 | Banks | 210/274 |
| 4,898,672 | 2/1990 | Clifft et al. | 210/614 |
| 4,919,815 | 4/1990 | Copa et al. | 210/605 |
| 5,009,776 | 4/1991 | Banks | 210/274 |
| 5,030,353 | 7/1991 | Stuth | 210/618 |
| 5,126,042 | 6/1992 | Malone | 210/150 |
| 5,227,051 | 7/1993 | Oshima | 210/150 |
| 5,232,586 | 8/1993 | Malone | 210/151 |
| 5,445,740 | 8/1995 | Malone | 210/618 |
| 5,573,663 | 11/1996 | Junius et al. | 210/189 |

FOREIGN PATENT DOCUMENTS

| 903800 | 8/1962 | Germany . | |
| 120867 | 11/1918 | United Kingdom | 210/274 |

*Primary Examiner*—Thomas G. Wyse
*Attorney, Agent, or Firm*—Roy, Kiesel & Tucker

[57] ABSTRACT

The present invention provides a floating media bioclarifier having an economical structure which allows energy efficient and water conserving backwashing of the floating media. The bioclarifier includes a filter chamber fluidly connected to a charge chamber which is adapted for accumulating air. A trigger device positioned between the charge chamber and filter chamber selectively allows the flow of air from said charge chamber to said filter chamber. An air source is connected to the charge chamber and slowly supplies air thereto. The backwash cycle is initiated by the trigger device allowing air to escape from the charge chamber into the filter chamber and adgitate the floating media. Simaltaneously, water from the filter chamber flows into the charge chamber. After the trigger device closes, air agains accumulate in charge chamber in preparation for another backwash cycle.

26 Claims, 15 Drawing Sheets

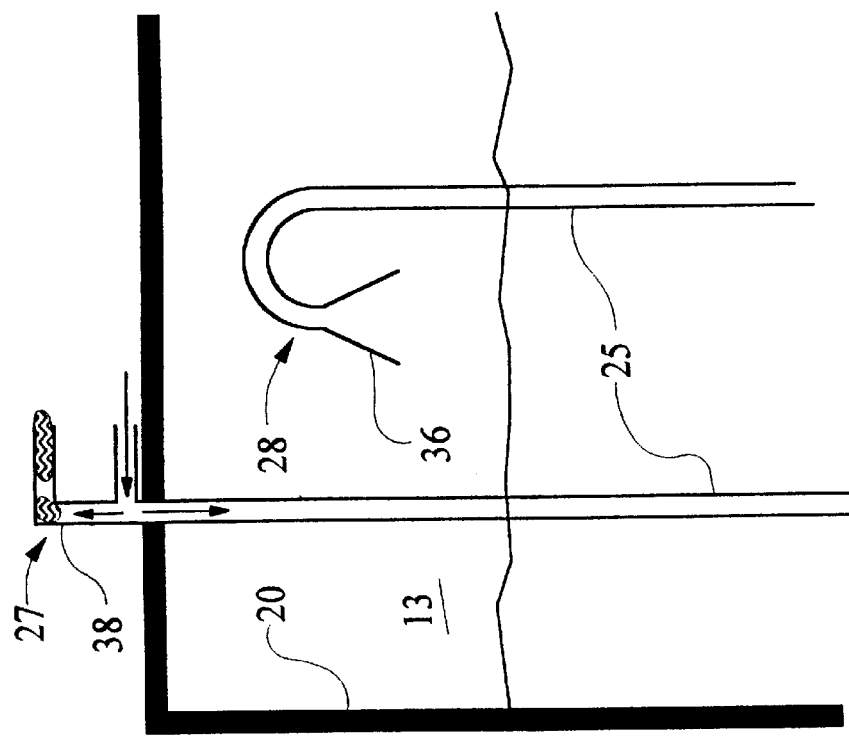
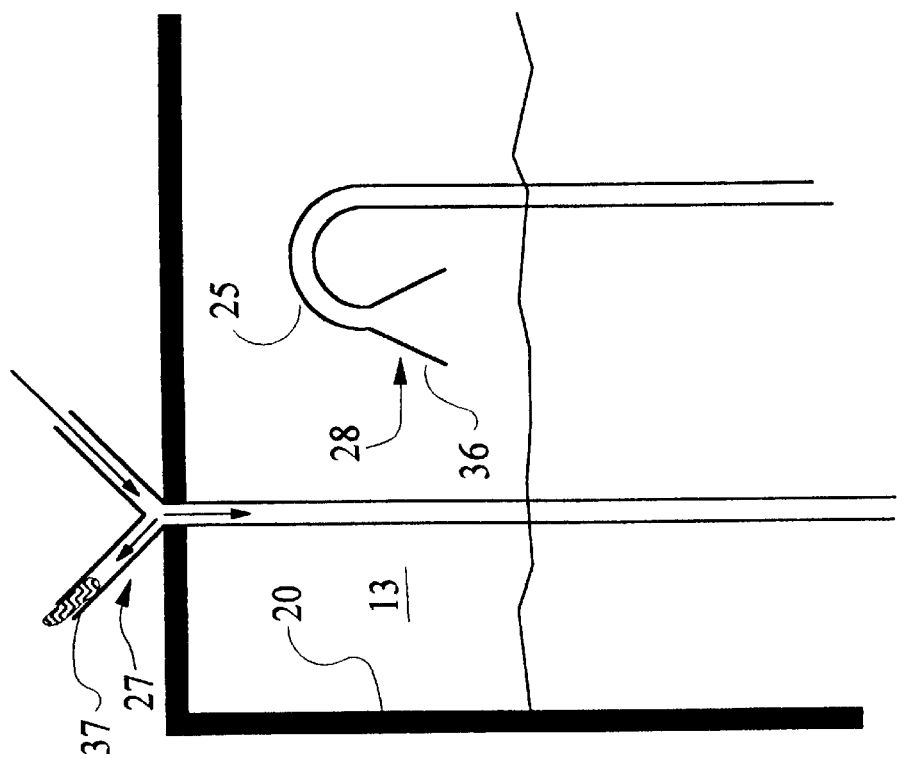

AIR CHARGED BACKWASHING BIOCLARIFIER

BACKGROUND OF THE INVENTION

I. Field of the Invention

This invention relates generally to wastewater treatment systems which physically and biologically treat wastewater and, more particularly, to treatment systems which use floating filter media to physically and biologically treat wastewater.

II. Description of Prior Art

In high density aquaculture systems used for the production of aquatic animals such as catfish, tilapia, alligators, and clams, and in other water systems which generate wastewater, it is necessary to remove suspended solids, optimize nitrification and to reduce biochemical oxygen demand (BOD) of the wastewater. In all cases, treated water is eventually returned to the ecosystem, whether the return is to a lake or stream or back to a controlled aquaculture system. Varying load and flow conditions make operation of waste treatment systems difficult, in that the timing of treatment steps is dependent upon such changing conditions.

In the operation of any wastewater treatment system, it is desirable to waste as little water as possible and to maximize the concentration of waste sludge accumulated by the system. This is especially true in high density aquaculture systems, where constant recirculation of water is necessary, and it becomes even more important to minimize the amount of water wasted in the treatment process. Water loss also becomes critically important when the waste water volume approaches the volume of the aquaculture system being treated, such as in aquaria used in pet stores and research labs. The principal problems with high water loss in any aquaculture system are: 1) the costs of treating high volumes of the backwashed waters, 2) in warm water aquaculture systems, heat losses due to release of the backwash water, 3) increased water demands and pretreatment costs, 4) high capital costs for pumps and other equipment whose size is dictated by peak water demands, and 5) high costs of replacing synthetic salts lost through backwashing a system being used in a marine (i.e. saltwater) application.

Most prior art systems accomplish treatment using various traditional treatment components, such as aeration basins, filters and clarifier units, with each component having its own treatment and energy consumption limitations. A system which efficiently combines the features of separate component systems would have greater advantages over those presently in use.

Three known filters which overcome most of these problems are the biofilters disclosed in U.S. Pat. No. 5,126,042, U.S. Pat. No. 5,232,586, and U.S. Pat. No. 5,445,740, all issued to the inventor herein, Dr. Ronald F. Malone (hereinafter "Malone I", "Malone II", and "Malone III" respectively). Malone I uses a tank having sidewalls which are inwardly sloping toward the bottom, wherein a floating media pack is caused to form near the top of the tank when it is filled with liquid during filtration. A high-speed, propeller-type agitator is employed to fluidize and expand the media pack and break up the filtered matter prior to backwashing the system. A drain line is opened near the bottom of the tank to allow accumulated sludge to leave the tank, and an outlet line is provided immediately above the media pack. Malone III is similar to Malone I, but uses slowly rotating paddles to gently fluidize and expand the media pack rather than the high speed propellers of Malone I.

Malone II employs a tank having an upper filtration chamber and a lower expansion chamber fluidically connected to each other by a constricted passageway. An inlet line supplies water to the tank through the lower chamber, while a floating media pack forms within the upper chamber during filtration. As in Malone I, an outlet line is connected to the tank above the media pack and delivers filtered water back to the aquatic environment. Contrary to Malone I, however, backwashing is accomplished by the displacement and expansion of the media pack through the constricted passageway. The turbulence of this expansion causes the filtered matter and sludge to fall toward a drain line located at the bottom of the tank. In most embodiments of Malone II, the backwashing method results in large water losses as compared to the methods of Malone I and III.

While these devices are well-suited to accomplishing the objectives stated in those patents, there still remain certain disadvantages inherent is these and other prior art systems. Periodic backwashing is a necessity for all expanding media filters and in many applications 5 or 6 backwashes per day is recommended. The prior art generally requires water to be flushed or removed from the tank during each backwashing operation. The backwashing water generally exits through a sludge line, is intermixed with the sludge and must be treated by a separate process before being released into the environment. This results in water being lost from the system under filtration and higher costs incurred in disposing of sludge mixed backwash water. As alluded to above, this water loss is particularly costly where the biofilter is used in a marine application since marine applications often employ water reconditioned with synthetic salts. In many instances, the costs of synthetic salts may make the replacement of reconditioned water lost in backwashing cost prohibitive. For example, most of the Malone II type biofilters may lose between 10 and 15 gallons of water for every cubic foot of filter media contained in the biofilter. While Malone I and III backwash with less water loss than Malone II (2–5 gallons per cubic foot of filter media), Malone I and III generally employ metal components in the structure supporting the propellers or paddles. In a marine environment, this structure is highly susceptible to corrosion by the salt water.

Furthermore, the prior art biofilters typically require the opening and closing of different valves during the backwashing process. For example, the influent and effluent lines are general closed and the sludge line opened during backwashing operations. While this is often automated to avoid tedious manual operation of the valves, the automating equipment is a significant part of the total cost of the biofilter. Automation of backwashing also includes the risks associated with a failure of the automating equipment. For example, automated backwashing systems generally include an automated ball valve. If the ball valve fails in the open position, it is possible that the whole system could be syphoned out through the sludge line. Finally, prior art systems like Malone I and III required motorized equipment to fluidize the filter media during backwashing, further adding to the costs of producing these types of biofilters.

Because of the energy required to backwash and the loss of water occurring during each backwashing operation, there is a practical limit in the prior art on how often a biofilter may be backwashed. In turn, less frequent backwashing leads to other problems and disadvantages. Less frequent backwashing allows more solids to accumulate in the filter media and adversely impact the nitrification rate of ammonia. Since ammonia is toxic to fish life, it is important in aquaculture systems to reduce the $NH_4$ and $NH_3$ (collectively known as Total Ammonia Nitrogen or TAN) to nitrite ($NO_2$) and nitrate ($NO_3$). As these solids decay, they both produce ammonia and consume the oxygen which could otherwise be used to reduce ammonia to nitrite and nitrate. Decaying solids also encourage growth of heterotrophic bacteria which compete for space with more desirable autotrophic bacteria. Additionally, the accumulation of solids and the overgrowth of biological floe in the filter media caused by less frequent backwashing increases the influent pressure required (and therefore the pumping capacity required) to force water through the filter media. This head loss caused by insufficiently frequent backwashing also prevents the employment of more efficient pumping technologies such as air lift pumps. Air lift pumps are far more economical to build and operate than convention pumps, but have limited lifting capacity making them impractical for use with prior art bioclarifiers. However, if a system was developed which rendered frequent backwashing economical, the head loss across the filter media could be kept sufficiently low so that air lift pumps could be effectively employed in bioclarifiers.

Another disadvantage found in prior art biofilters is the tendency to experience "blow down turbidity." Blow down turbidity occurs at the end of the backwash cycle and is a result of the fluidization of sediments during backwashing. When the biofilter is returning to the normal filtration stage, a certain amount of turbid water is forced through the effluent outlet before the media can re-form into a compact enough bed to effectively filter the entrained solids.

Finally, certain characteristics of the prior art required the biofilter tank to take on special geometric shapes in order for the biofilter to operate in the most efficient manner. For example, a preferred embodiment of the biofilter in Malone II taught a restriction in the midsection of the tank in order to most efficiently expand the filter media during backwashing.

SUMMARY OF THE INVENTION

Therefore, it is an object of this invention to provide a floating media biofilter which allows backwashing of the media without the loss of water.

It is another object of this invention to provide a floating media biofilter that will allow considerably more frequent backwashing than practical with prior art biofilters.

It is a further object of this invention to provide a floating media biofilter that does not require electro-mechanical valves or other components that are subject to failure.

It is still a further object of this invention to provide a floating media biofilter that is more economical to built and operate than hereto known in the art.

Therefore the present invention provides a tank for a floating media biofilter. The biofilter tank comprises a filter chamber and a charge chamber for intermittently storing air. The charge chamber includes an air outlet for admitting air into said filter chamber, a water inlet, an air inlet, and a trigger for selectively allowing the passage of air through said air outlet.

BRIEF DESCRIPTION OF THE DRAWINGS

FIGS. 7a and 7b illustrate different trigger syphon inlet and outlet modifications.

DETAILED DESCRIPTION

Figure 1:
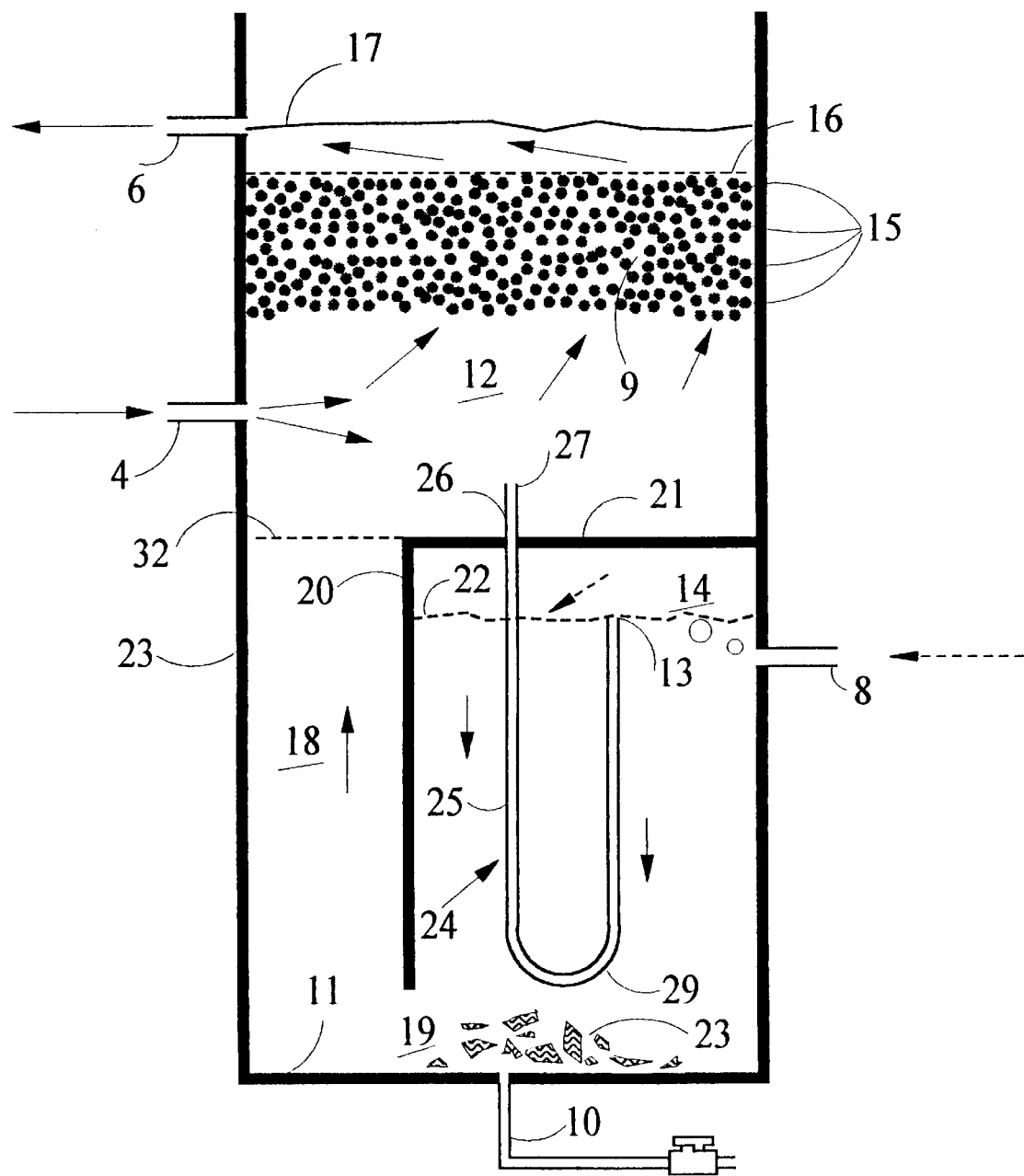
FIG. 1 is a basic embodiment of the biofilter and tank of the present invention illustrating the biofilter at the beginning of its normal operating cycle.

In the drawings many details pertaining to fabrication and maintenance utility well-established in the machine construction art and not bearing upon points of novelty are omitted in the interest of descriptive clarity and efficiency.

FIG. 1 illustrates a basic configuration of the floating media biofilter 1 of the present invention. Biofilter I comprises a tank 2 having an wastewater or influent inlet 4, a treated water or effluent outlet 6, and a sludge outlet 10. Tank 2 will further comprise at least two compartments, filter chamber 12 and charge chamber 13. Filter chamber 12 will accommodate a bed 9 of floating filtration media 15. Floating media 15 will preferably comprise multiple low density granular media pellets. The pellets may be of any suitable material, but plastic is preferred. Low density polyethylene feed stock pellets one-eighth inch in diameter have been found to be suitable in experimental units. Enhanced biofiltration can be achieved by shaping the pellets into tubular or fluted shapes (not shown) which influence the retention of solids produced by biological treatment (biofloc). Enhanced filtration can also be achieved employing multiple media beds. Multiple media beds consist of media pellets of varying size and buoyancy. Typically smaller diameter pellets will be made more buoyant than larger diameter pellets by altering their specific density in the manufacturing process. Thus the multiple media forms a more efficient, graduated filter, with larger particles being trapped in the lower section of the bed and smaller particles being trap further upper section of the bed.

Floating media 15 will form a media pack 9 when tank 2 is filled with water or other liquid, and when media 15 are left undisturbed. A screen 16 or some other some other water permeable barrier will be positioned between effluent outlet 6 and floating media 15 to prevent the media pellets from escaping tank 2 through effluent outlet 6.

Inlet line 4 and outlet line 6 are sized to accommodate flow rates appropriate for the particular application. For example, in aquaculture applications flow rates of about 5–15 gallons per minute (g.p.m.) per cubic foot ($ft^3$) of filter media are generally used assuring that oxygen and ammonia transport rates are matched with the ammonia and biochemical oxygen demand (BOD) loadings. In high substrate regimes associated with wastewater treatment, flow rates are increased into a range of about 20–40 g.p.m./$ft^3$ to avoid oxygen depletion. An alternative method of avoiding oxygen depletion consists of saturating or super-saturating the influent with oxygen prior to its entering the system. Both inlet and outlet lines 4 and 6 may be constructed of any suitable material, such as commercially available polyvinyl chloride (PVC) pipe.

Figure 9:
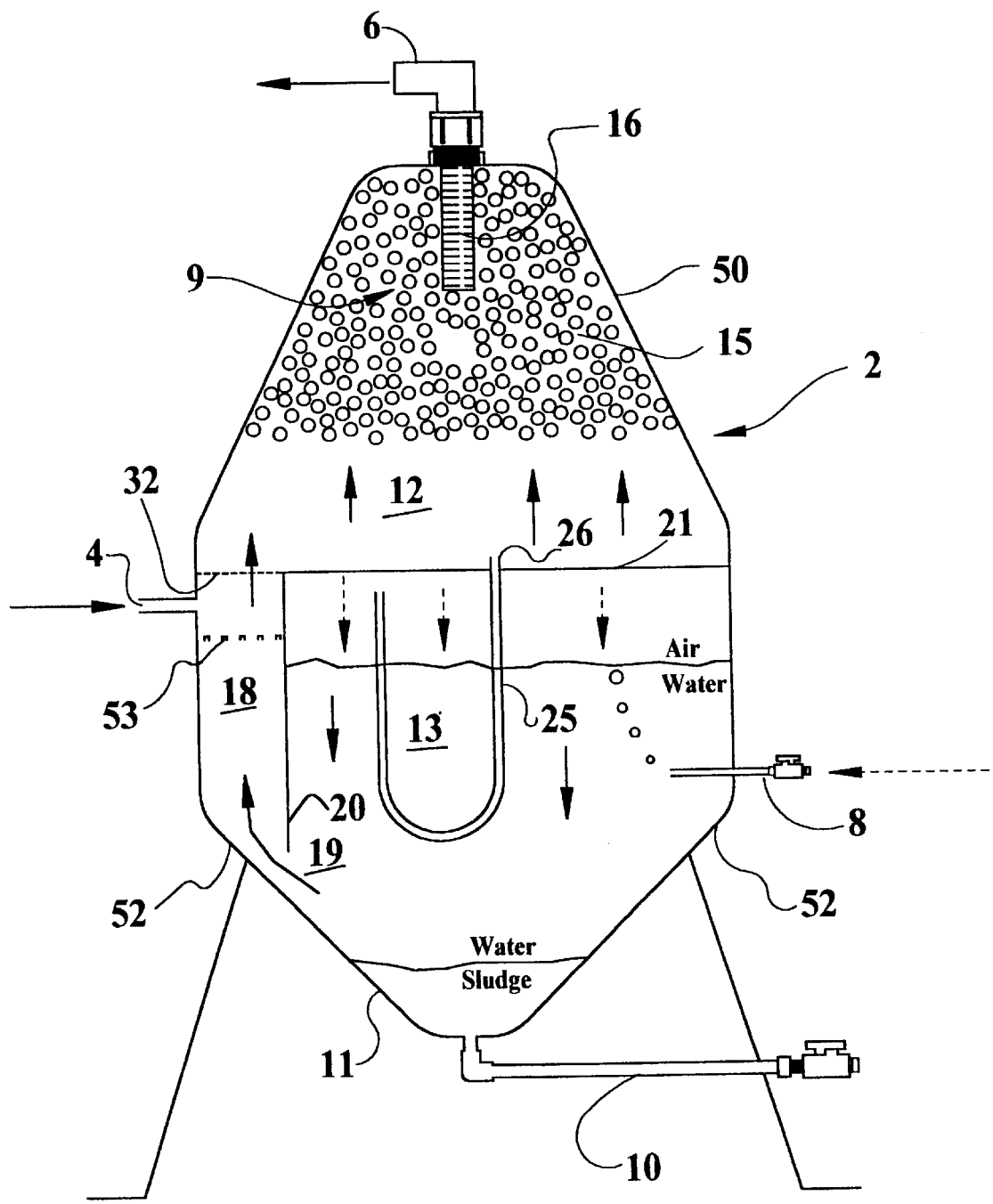
FIG. 9 illustrates a second embodiment of the bioclarifer tank of the present invention.

Positioned in a lower section of tank 2 is a charge chamber wall 20 defining a charge chamber 13. Charge chamber 13 forms a substantially airtight enclosure along the length of wall 20. Formed between the outside wall 23 of tank 2 and charge chamber wall 20 is a settling area 18 through which water passes before entering charge chamber 13. A subsection of wall 20 will include top wall 21. While not shown in the figures, top wall 21 could be inclined to induce any solids settling on top wall 21 to migrate toward settling area 18 rather than being retained on a basically horizontal top wall 21. It is believed to be most efficient to slope top wall 21 at an angle of 30°–45° from the horizontal. In the embodiment shown in FIG. 1, wall 20 terminates in the approximate vicinity of the bottom 11 of tank 2. Between bottom 11 and wall 20 is water inlet passage 19 which will allow the transfer of water between filter chamber 12 and charge chamber 13 as will be explained in detail below. How closely wall 20 approaches tank bottom 11 will be determined in part by the amount of sludge it is anticipated will accumulate on bottom 11 before being removed through sludge line 10. Typically sludge will be removed between once per day and once per week. Therefore wall 20 must be sufficiently distant from bottom 11 to allow the maximum anticipated volume of sludge to accumulate between removals without the accumulating sludge blocking passage 19. Generally, bottom 11 will form a sludge basin 34 wherein sludge may accumulate until removed through sludge outlet line 10. While sludge basin 34 may take any number of shapes, one preferred embodiment will form sludge basin 34 in a conical shape 35 as seen in FIG. 9. A pellet or "bead" screen 32 is positioned between filtration chamber 12 and passage 19. Bead screen 32 is intended to insure pellets do not migrate to charge chamber 13. However, a bead screen 32 is not critical to the function of the biofilter. Since the pellets float, it is expected that comparatively few pellets will find their way into charge chamber 13 even in the absence of a screen.

An air inlet 8 will communicate with charge chamber 13 in order to allow the introduction of air into charge chamber 13 and an air outlet 26 formed in top wall 21 will allow the transfer of air from charge chamber 13 to filter chamber 12. The term "air" will generally mean the mixture of gases naturally occurring in the atmosphere but could include any gas or combination of gases. A trigger 24 for initiating this transfer of air will be positioned to communicate with the filter chamber 12 and a variable air pocket 14 which will be formed in charge chamber 13 above water level 22. In the embodiment shown in FIG. 1, trigger 24 is a syphon 25 positioned inside of charge chamber 13. A first section of syphon 25 extends through air outlet 26 and has a first opening 27 communicating with filter chamber 12. A second section of syphon 25 has an opening communicating with variable air pocket 14 in the interior space of charge chamber 13 and the lowermost section of syphon 25 has a bend 29.

Operation of Biofilter

As seen in FIG. 1, biofilter 1 is operating in the normal filtration mode. Influent enters tank 2 through inlet line 4 and is delivered to tank 2 by a pump or any other means capable of lifting the water to the top of tank 2 so that effluent may exit through outlet line 6. During treatment, biological growth forms a film on each pellet of filtration media 15 of media bed 9, which in turn provides nitrification and BOD reduction. Suspended solids removed by media bed 9, as well as biofloc, form a floc, some of which falls from media bed 9 and settles on top wall 21 and in the lower sections of tank 2, forming sludge 23. During the filtration stage, the floc on media bed 9, over a period of time, will tend to bridge from pellet to pellet, requiring periodic agitation of the media bed 9 (referred to as "fluidization") to loosen solids for removal. Such fluidization is achieved during the backwashing stage of operation which is explained further below.

Figure 2:
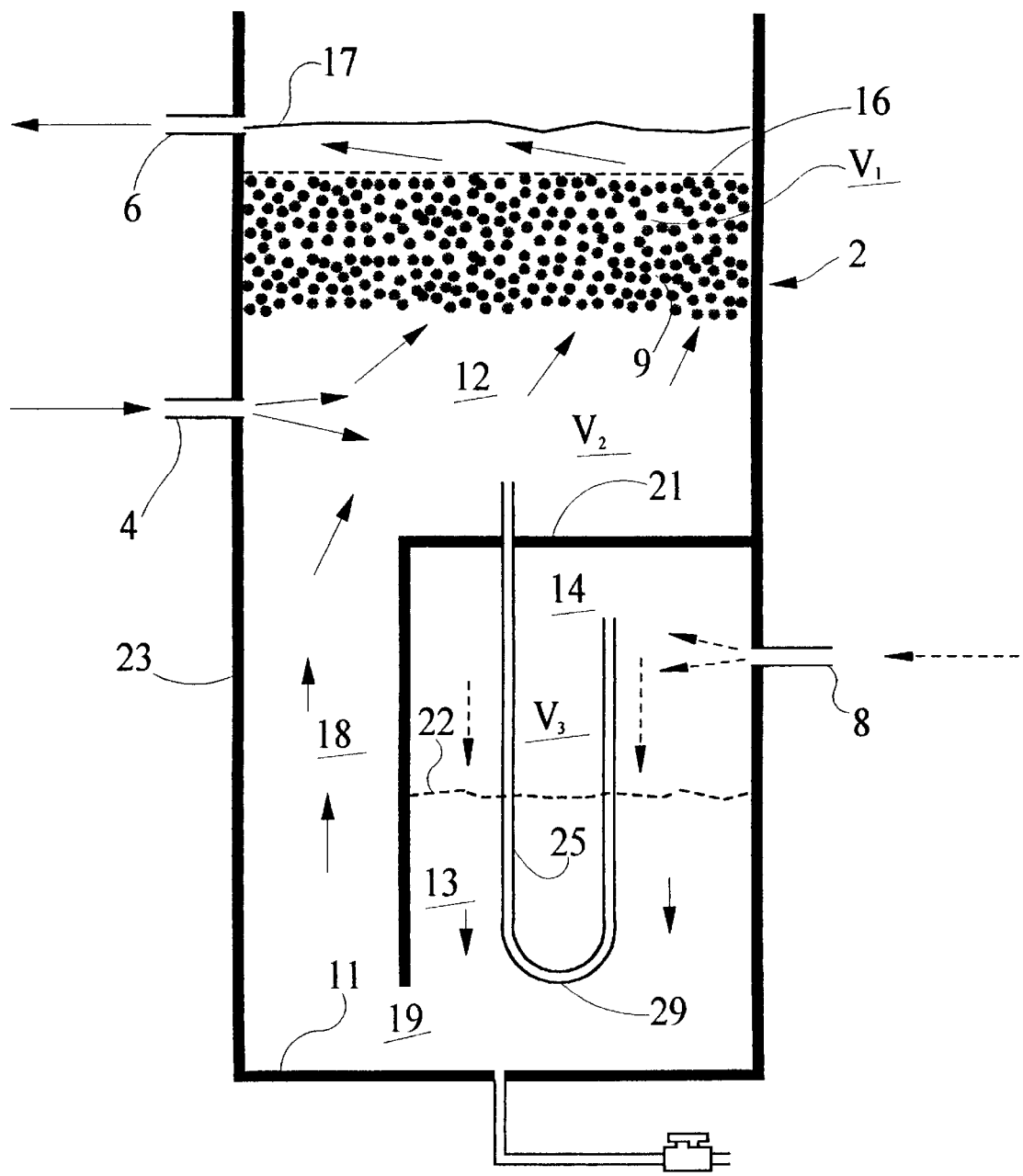
FIG. 2 illustrates the biofilter at an intermediate stage of operation with the charge chamber half-filled with air.
Figure 3:
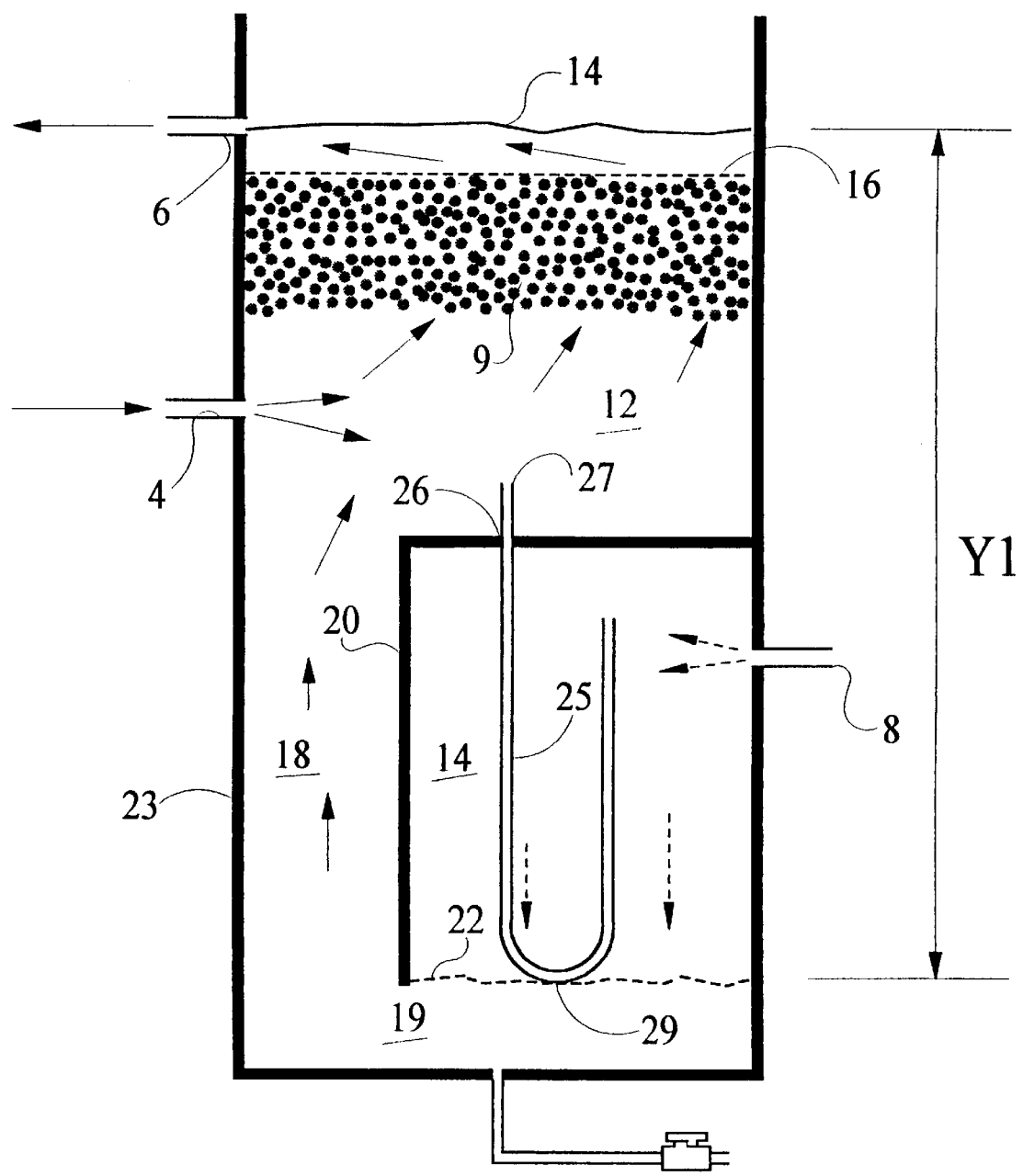
FIG. 3 illustrates the biofilter just prior to beginning the backwash stage of operation.
Figure 4:
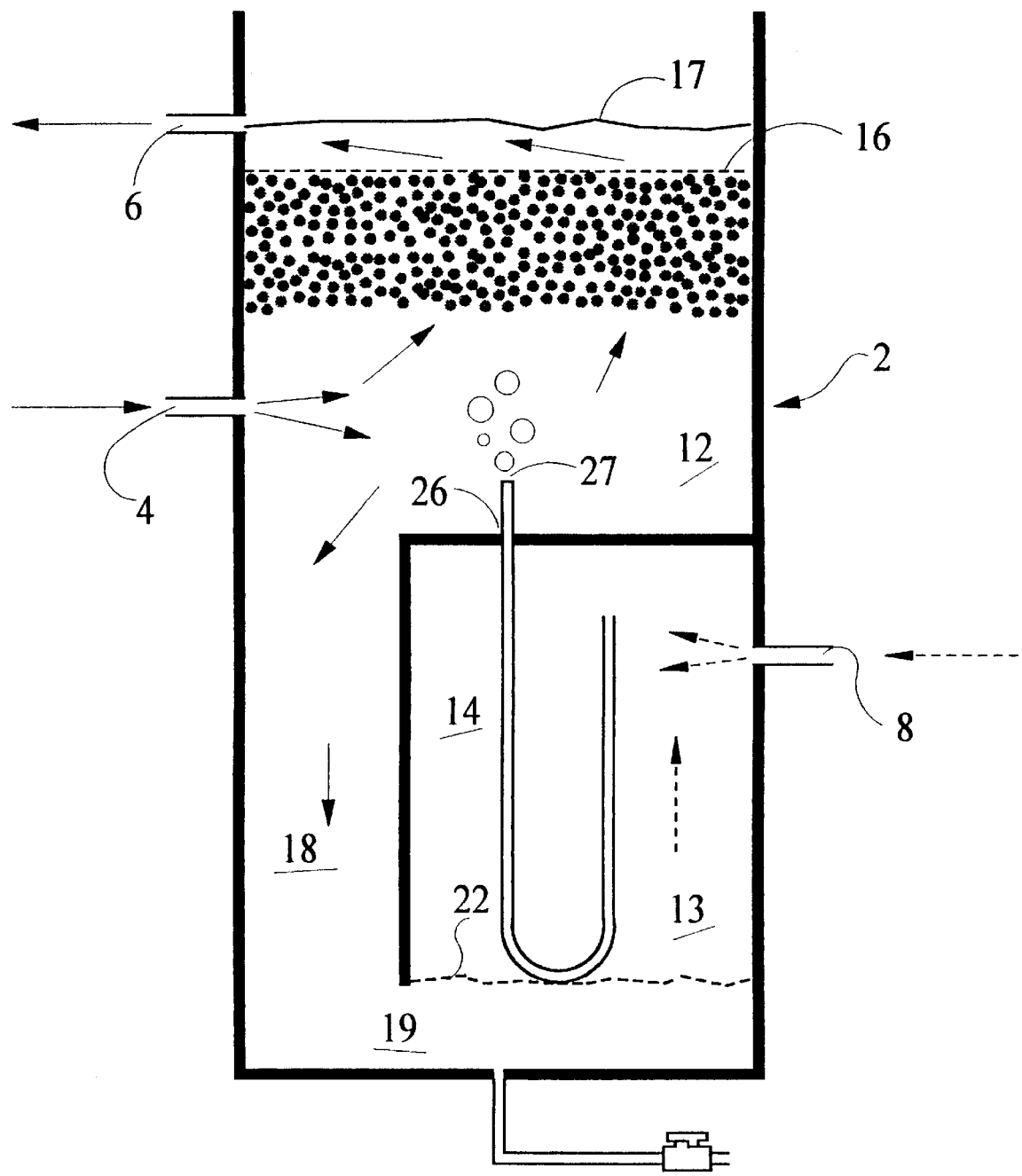
FIG. 4 illustrates the biofilter as the backwash stage begins and air moves from the charge chamber to the filter chamber.
Figure 5:
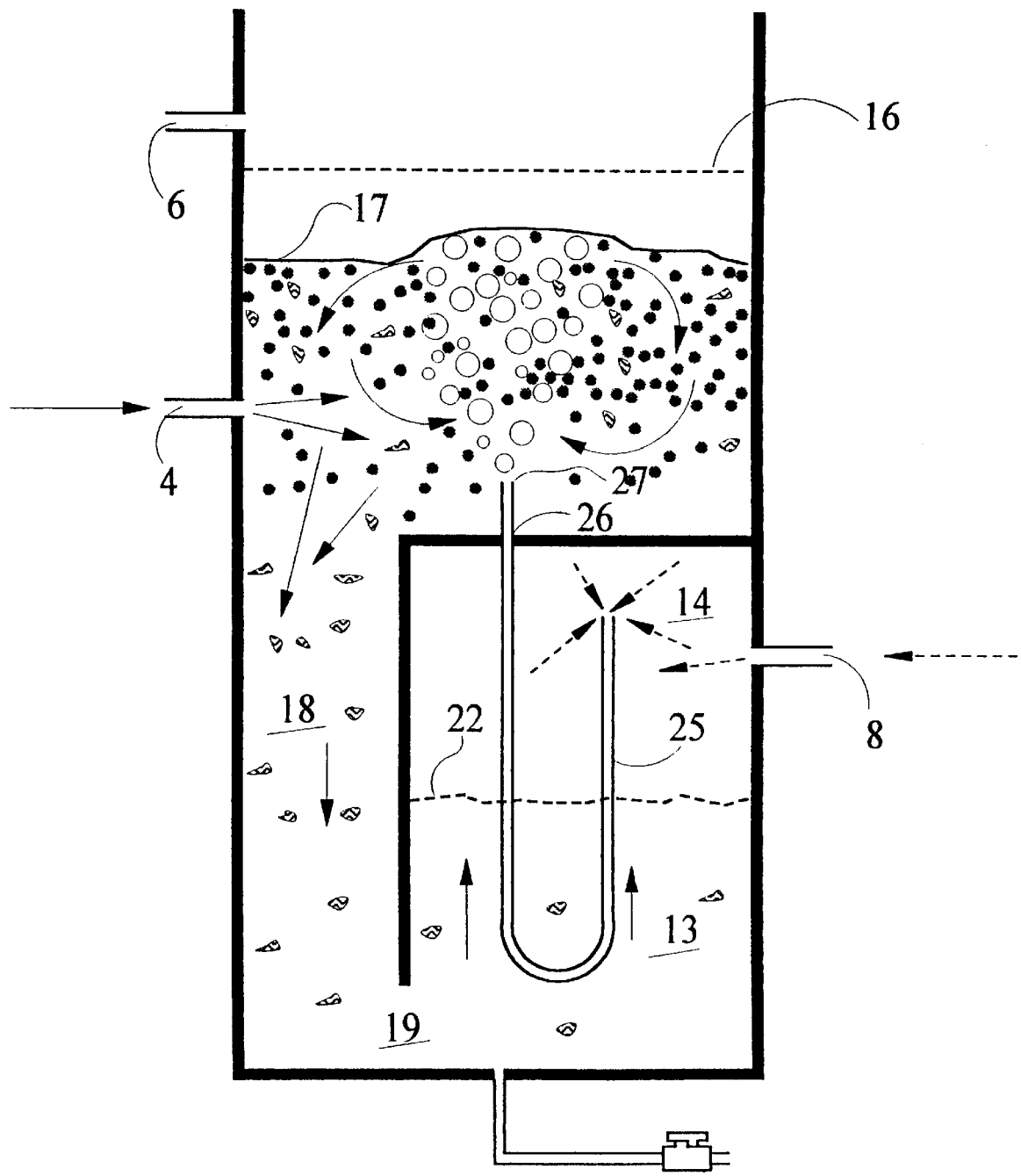
FIG. 5 illustrates the biofilter at an intermediate point in the backwash stage with water beginning to fill the charge chamber.

During the normal filtration mode, air is slowly entering air inlet 8 and accumulating in air pocket 14. Air pocket 14 gradually increases in size, displacing water from charge chamber 13 and lowering the water level 22 in charge chamber 13 as seen in FIG. 2. As air continues to accumulate in charge chamber 13, water level 22 will eventually reach the syphon bend 29 as seen in FIG. 3. At the point water level 22 moves below syphon bend 29, the pressure in charge chamber 13 will have exceeded the opposing pressure created by the column of water Y1 between the fluid surface 17 and syphon bend 29. As seen in FIGS. 4 and 5, air then begins to rapidly escape from charge chamber 13 through syphon 25 and air outlet 26. As air exits charge chamber 13, water from filter chamber 12 will flow into charge chamber 13 through passage 19. The rate air exits charge chamber 13 and is replaced by water is generally controlled by the cross sectional area of the passage through syphon 25 and air outlet 26. As discussed below in connection with the alternate embodiment described in FIG. 10, the cross sectional area of settling area 18 may also be a controlling factor when settling area 18 is comparatively small.

Figure 6:
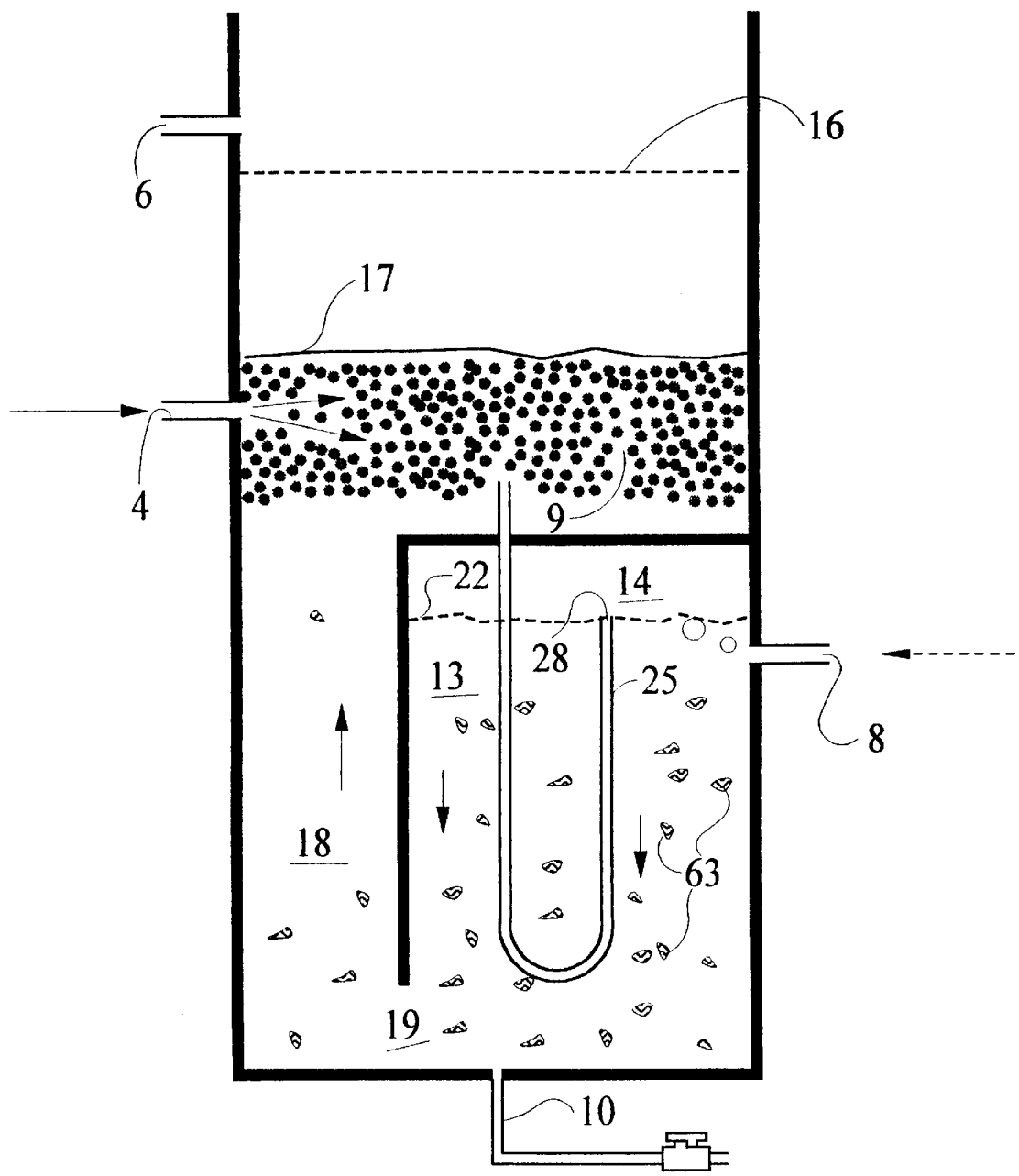
FIG. 6 illustrates the biofilter at the completion of the backwash stage with the filter chamber refilling with water prior to resuming the normal filtration stage.

The rapid displacement of air from charge chamber 13 to filter chamber 12 accomplishes at least two objectives. First, as shown in FIG. 5, the rapid flow of bubbles from inlet 26 through the media bed 9 will vigorously agitate the beads as media bed 9 is dropping toward the bottom of filter chamber 12 and thereby allowing excess floc and trapped sediments to be removed from filter media 15. Second, the exiting of air from charge chamber 13 allows water to enter the charge chamber 13 at a much higher rate than the rate at which water is entering tank 2 through water inlet 4. This allows the water in filter chamber 12 to flow into settling area 18 and charge chamber 13 and to lower or "drop" media bed 9 to a lower section of filter chamber 12 as seen in FIG. 6. When water level 22 on filter chamber 12 rises above the interior opening 28 of syphon 25, as seen in FIG. 6, air is no longer able to flow through syphon 25 and syphon 25 fills with water. Water level 22 continues to rise until the pressure in air pocket 14 is equal to the water pressure generated by the column of water between water surface 17 and water surface 22. As waste water continues to enter tank 2 through inlet 4, filter chamber 12 will fill and filter media 15 will float toward screen 16. When filter media 15 is restrained against screen 16, waste water will again flow through filter media 15 and exit tank 2 through outlet 6.

After water level 22 has reached its maximum level in charge chamber 13 during the backwashing cycle, water level 22 will drop at a comparatively slow rate as air enters charge chamber 13 through inlet 8. Thus charge chamber 13 is a relatively quiescent zone after water level 22 has reached its maximum level during the backwashing cycle. This allows charge chamber 13 to act as a primary clarifying area in which floc 63 removed from filter media 15 and transported to charge chamber 13 during backwashing, will be able to settle to the bottom of tank 2. The settling area 18 is also a quiescent zone which allows the settling of floc particles which did not reach charge chamber 13 during backwashing When the trigger 24 is a syphon 25 as shown in the above embodiment, experience has shown certain syphon inlet and outlet shapes may be desirable. For example, at the syphon interior opening or inlet point, there is a tendency for an air/water mixture to be pushed into the syphon rather than only water. Where the syphon tubing is comparatively small, such as 6 mm or less in diameter, surface tension will prevent air bubbles from flowing through the syphon tube. When air bubbles hinder the flow of water through syphon 25, variable or premature triggering of the syphon may occur since the bubbles, in effect, reduce the column of water in the syphon tube. FIGS. 7a and 7b are detailed views of preferred modifications of syphon inlet 28 and syphon outlet 27 of syphon 25. It has been discovered that inverted cone shaped inlets 36 as seen in both FIGS. 7a and 7b tend to avoid the problem of bubble entrainment.

While inlet bubble entrainment is not a problem for syphon tubes over approximately 6 mm in diameter, surface tension in syphon tubes between 6–12 mm in diameter will often hinder the escape of bubbles from a single tube outlet end 27, such as syphon tube 25 as seen in FIG. 1. One means of overcoming this problem is to employ dual discharge outlets such as Y-shaped outlet 37 in FIG. 7a or F-shaped outlet 38 in FIG. 7b. One branch of the dual discharge outlet allows the release of bubbles while the second branch allows the influx of water. Finally, in circumstances where the syphon tube is above 12 mm, bubble retention is not a serious problem since the rapid change in bubble volume to surface area ratio allows buoyancy forces to easily overcome surface tension forces. While either inlet 28 or outlet 27 may be covered with screens to help prevent clogging, it is more typical to place screening only on inlet 28. Screens are particularly desirable when dealing with smaller diameter syphon tubes.

While the relative size of filter chamber 12 and charge chamber 13 can vary to a large degree, it has been found that the volume of charge chamber 13 should be at least as large, and typically larger than, the combined volume of the fluid in filter chamber 12 and the volume of influent entering the tank during backwashing. Charge chamber 13 may be sized according to the equation:

$$V_3 \geq (e)V_1 + V_2 + Qi(t_{wash})$$

where:

$V_3$ is the charge chamber volume (see FIG. 2);

$V_1$ is the volume of the filter media bed;

e is the porosity of the filter media bed;

$V_2$ is the volume of the filter chamber not containing filter media;

Qi is the flow rate of the influent into the tank; and $t_{wash}$ is the time required for backwashing.

Generally it is preferred that $V_3$ range between $V_3=1.3[(e)V_1+V_2+Qi\ (t_{wash})]$ and $V_3=2[(e)V_1+V_2+Qi(t_{wash})]$. However, this range is not absolute and other variations of $V_3$ are intended to come within the scope of the present invention. Furthermore, it will be understood that the slow addition of air over time into the charge chamber 13 provides a far more efficient manner of powering the backwash operation than hereto known in the art. Because of the relatively slow flow of air required to operate the present invention, much less power may be used than required to operate conventional biofilters. For example, an air pump typically used in a small aquarium could be used to operate the present invention filtering a large koi pond or similar system.

The present invention's manner of operation provides other benefits in addition to the minimal use of power. For example, as sludge accumulates in prior art biofilters, there is a tendency for the sludge to undergo anaerobic degradation from lack of oxygen and to produce undesirable compounds. When the present invention transfers wastewater from the filter chamber 12 to the charge chamber 13, the waste water passing over the sludge moderately disturbs and re-aerates the sludge; thereby reducing anaerobic reactions. Additionally, the gradual rate at which water is moved from the charge chamber 13 to the filter chamber 12 benefits wastewater treatment. At the end of the backwash cycle when charge chamber 13 is filled with wastewater, the wastewater contains many entrained solids and other undesirable products, such as TAN compounds release from the sludge. The slow rate of water removal from charge chamber 13 allows the larger entrained solids to settle. The finer solids and TAN compounds will be introduced to filter chamber 12, but at a very gradual rate. This gradual introduction of fine solids and TAN compounds prevents the biological system from being overloaded or shocked by their re-introduction.

Figure 8B:
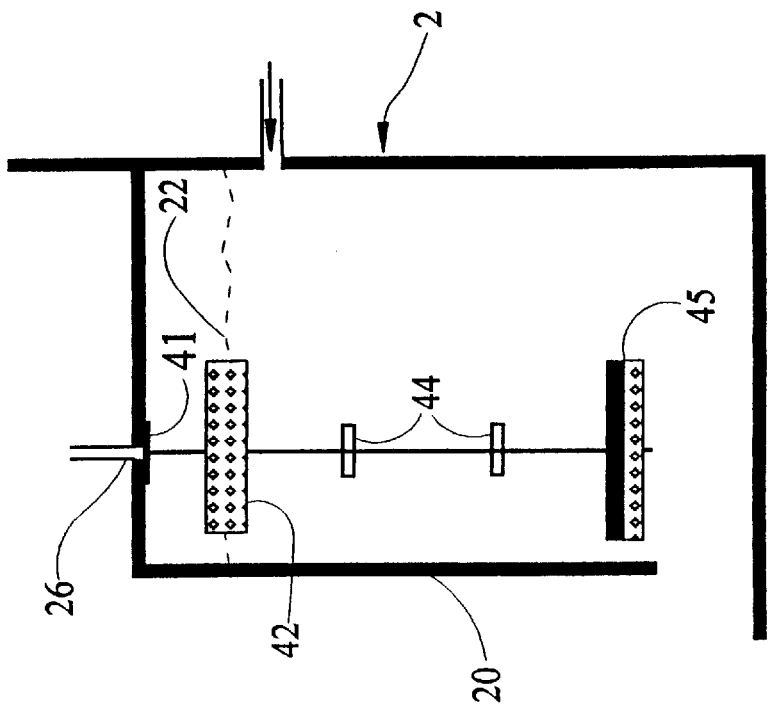
FIGS. 8a–8f illustrate an alternate triggering mechanism and the alternate trigger's operation.
Figure 8A:
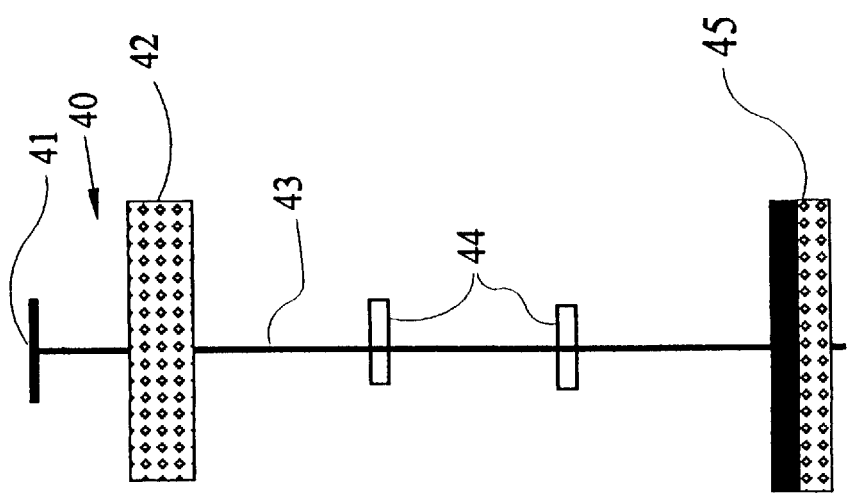
Figure 8D:
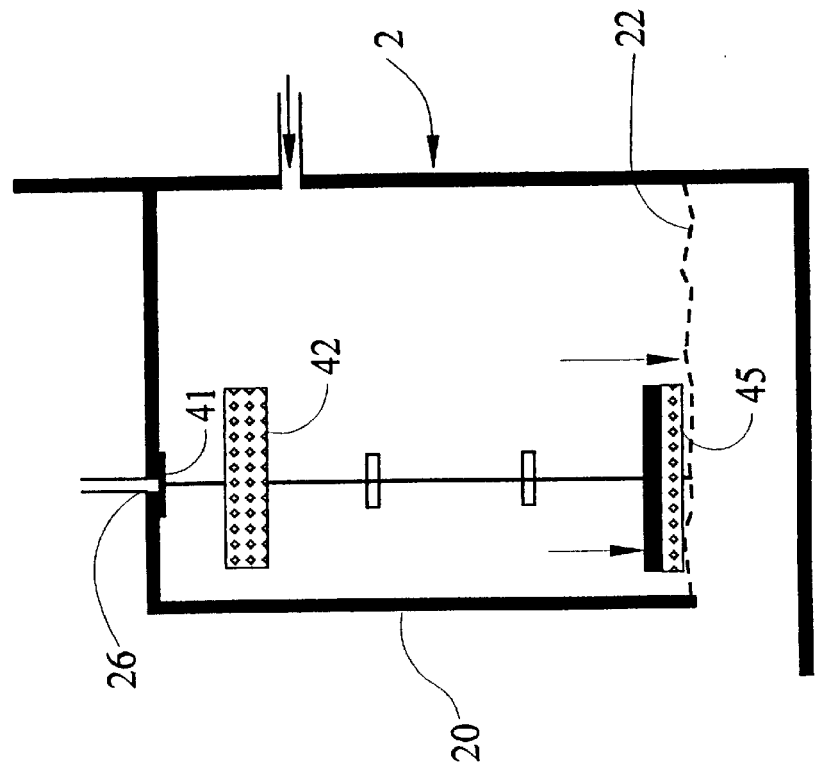
Figure 8C:
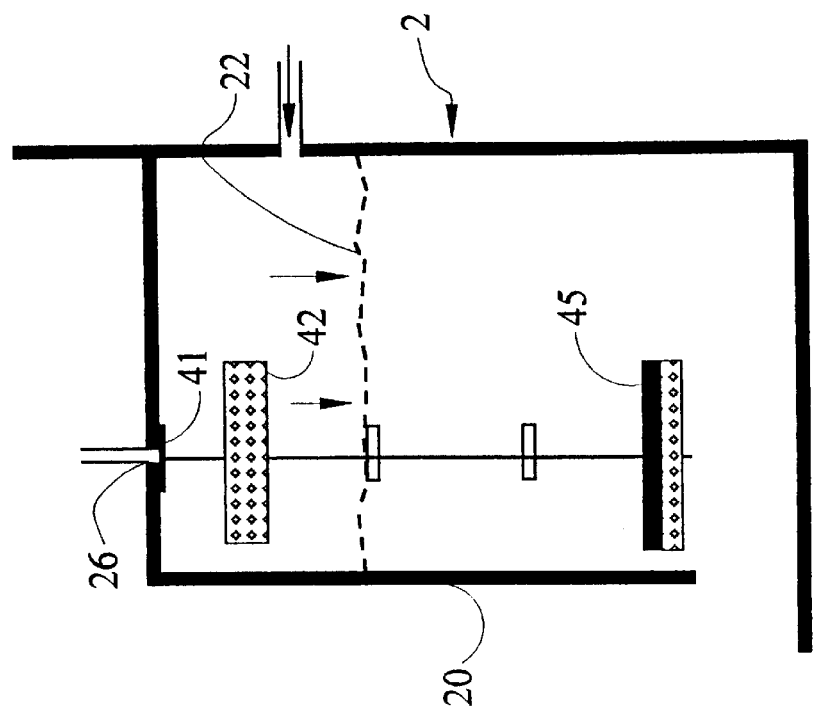
Figure 8F:
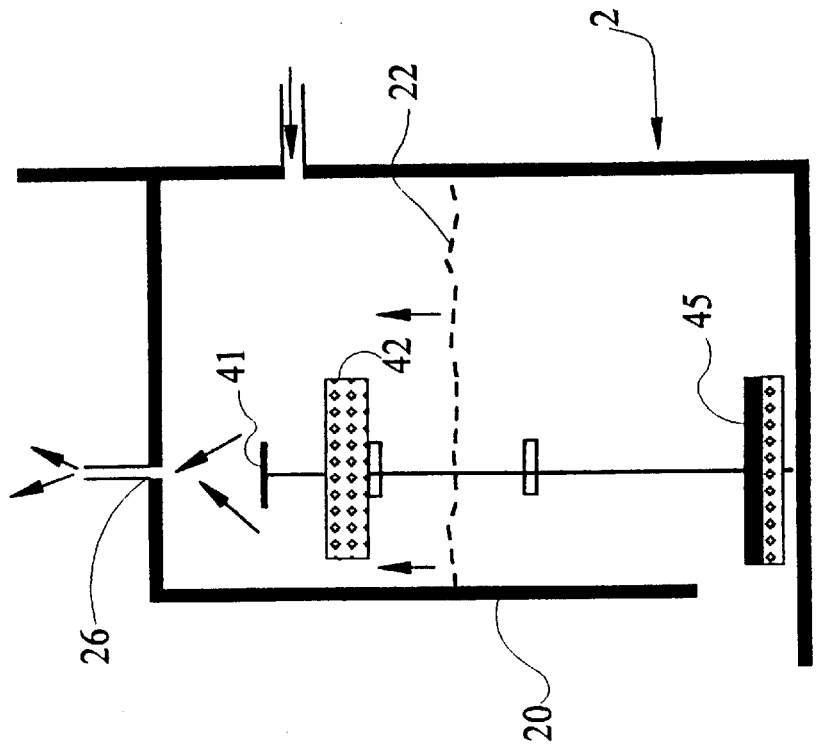
Figure 8E:
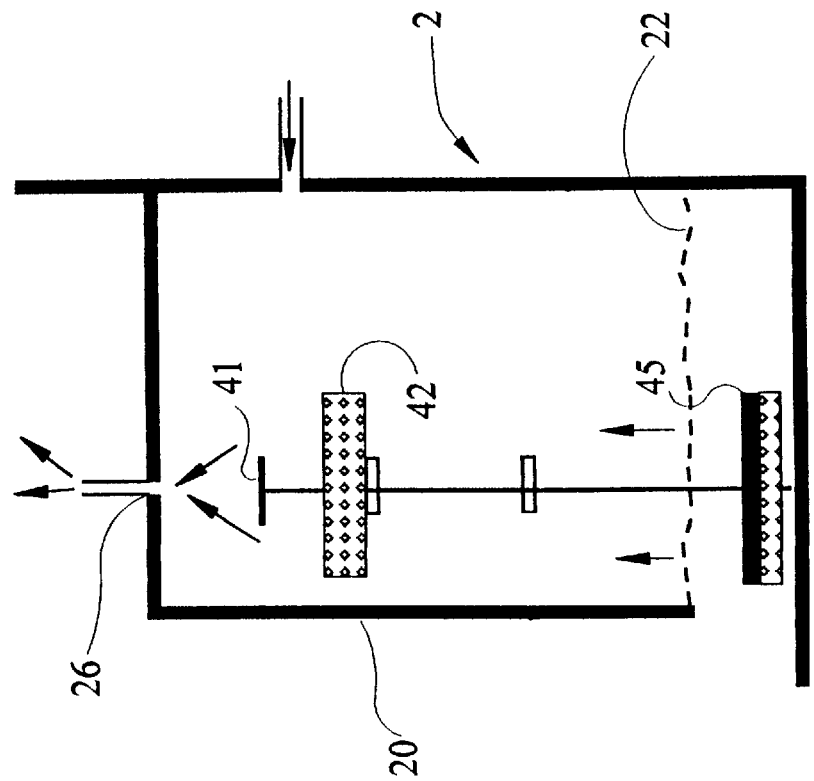

Although the trigger 24 shown in FIGS. 1–6 is syphon 25, the present invention can be operated with many variations of trigger 24. Any trigger device which will selectively allow air to be transferred from the charge chamber 13 to the filter chamber 12 may be utilized. One such alternate trigger device is seen in FIGS. 8a–8f. FIG. 8a illustrates the major components of alternate trigger 40 which include support shaft 43, brackets 44, mechanical seal 41, lightweight float 42, and neutrally buoyant counter-weight 45. FIG. 8b shows trigger 40 positioned in charge chamber 13 of tank 2 at the beginning of the normal filtration stage of the biofilter's operation. Brackets 44 will secure support shaft 43 in charge chamber 13 such that trigger 40 may slide vertically causing mechanical seal 41 to move in to and out of contact with air outlet 26. During the filtration stage shown in FIG. 8b, mechanical seal 41 will form an air tight seal with air outlet 26 and prevent the escape of air from charge chamber 13 into filter chamber 12. As air enters charge chamber 13, the increasing pressure will cause water level 22 to drop and lightweight float 42 to become fully emerged as seen in FIG. 8c. However, mechanical seal 41 does not unseat from air outlet 26 on the emergence of lightweight float 42. Rather, mechanical seal 41 is sized such that the pressure in charge chamber 13 acting against mechanical seal 41 will maintain trigger 40 in the closed position against the combined downward force caused by the weight of water on the opening of air outlet 26, the weight of lightweight float 42, and the weight of support shaft 43. However, as water level 22 continues to drop, neutrally buoyant counter-weight 45 eventually begins to emerge (FIG. 8d) resulting in an additional downward force of counter-weight 45 acting on seal 41. Counter-weight 45 and mechanical seal 41 are sized such that mechanical seal 41 will become unseated from air outlet 26 as counter-weight 45 becomes fully emerged. It can be seen from FIGS. 8b–f that the counter-weight 45 is position such that it will become fully emerged and the seal broken with air outlet 26 just prior to water level 22 dropping below the bottom of wall 20. When mechanical seal 41 becomes unseated from air outlet 26, trigger 40 will slide downward in brackets 44 allowing air to enter filtration chamber 12 through air outlet 26 as seen in FIG. 8e. As water level 22 rises in charge chamber 13 during backwashing (FIG. 8f), lightweight float 42 will eventually become submerged. Lightweight float 42 will have sufficient buoyancy to begin moving trigger 40 upward to bring mechanical seal 41 back into contact with air inlet 26 as seen in FIG. 8b. From this point on, a new charging cycle will begin as air collects in charge chamber 13.

Mechanical trigger 40 may have certain advantages over syphon trigger 25 when the waste water being treated contains a high loading of solids, organics or oils. In such a situation, trigger syphon 25 may be susceptible to clogging over an extended period of time. However, since mechanical seal 41 remains out of contact with the waste water the majority of the time the biofilter is operating, it is more resistant to long term biofouling.

While not shown in the Figures, many alternate trigger mechanisms could be used with the present invention. For example, a solenoid valve could be positioned between filter chamber 12 and charge chamber 13. A timer could be used to estimate the point at which charge chamber 13 is filled with air. The timer would then open the solenoid valve for a sufficient time to allow the backwashing events described above to take place. Another manner of opening the solenoid valve would be a sensor device at the bottom of charge chamber 13, which signals the solenoid valve when the water level is approaching the bottom of charge chamber 13. The solenoid valve could also be signaled by a float combined with a mercury switch: when the level of the water ceased to buoy up the float, the mercury switch would be activated. These are but a few illustrative examples, and all such triggering/indicating devices known in the art are intended to be within the scope of the present invention.

An alternate embodiment of tank 2 is shown in FIG. 9. The filter chamber 12 of tank 2 will have downwardly diverging sidewalls 50 so that media bed 9 may more easily slide downward and away from sidewalls 50 in order to expand during backwashing. Additionally, bead screen 16 may be formed of a slotted section of piping which extends downwardly from effluent outlet 6. Tank 2 will have an inlet screen 32 that will screen large solids and prevent their entering filtration chamber 12 and will also prevent the possible migration of filter media pellets into charge chamber 13. As with the previous embodiment of tank 2, the inlet screen 32 is not critical and alternate embodiments of the biofilter may be operated without inlet screen 32. A diffuser 53 is shown positioned below inlet 4 and will tend to dissipate the kinetic energies of flowing waters. Diffuser 53 will protect the quiescent zones in charge chamber 13 and will prevent potential disruption of sludge in sludge basin 34. Tank 2 will also have sloping side walls 52 which will aid in moving settling solids to the sludge collecting area of tank bottom 11. Similar to the previous embodiments, charge chamber wall 20 will have a top component 21 which may be somewhat inclined in order to induce any solids falling from media bed 9 to migrate toward settling area 18.

Figure 10:
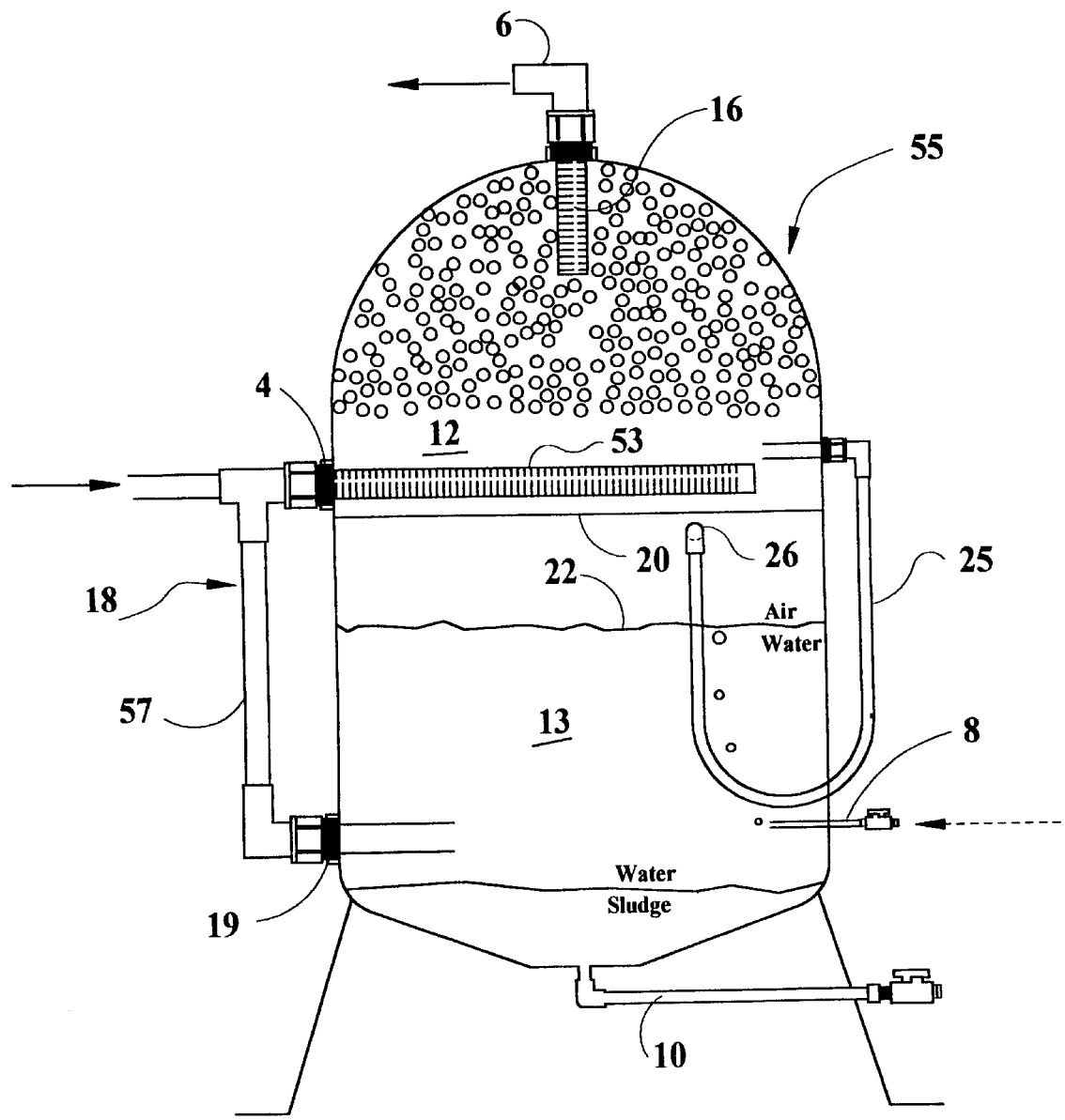
FIG. 10 illustrates a third embodiment of the bioclarifer tank of the present invention.

A further alternative embodiment of tank 2 is illustrated in FIG. 10. The interior of tank 2 is completely divided by wall 20 into two separate containers forming filter chamber 12 and charge chamber 13. This embodiment has, in addition to an outlet screen 16, an inlet screen 53 formed by a section of slotted piping extending into tank 2 from inlet 4. Connected at inlet 4 but positioned external to tank 2 is a section of piping 57 forming a settling area 18. This piping 57 will communicate with charge chamber 13 to form passage 19 between filter chamber 12 and charge chamber 13. As mentioned above, the cross-sectional area of settling area 18 in this embodiment is small enough to effect how rapidly water will replace the air in charge chamber 13 and therefore how vigorously the filter media 15 is agitated during backwashing. The vigor of the backwashing will be modified depending on the tendency of particular filter media 15 to retain excessive biofloc. Piping 57 must therefore be sized large enough to insure a sufficiently vigorous washing of filter media 15. Furthermore, tank 2 will include an external syphon 25 connecting at one end into filter chamber 12 and the other end into charge chamber 13. FIG. 10 illustrates how air outlet 26 need not be formed in wall 20, but may be positioned anywhere as long as a passage may be established between charge chamber 13 and filter chamber 12. Syphon 25 may be constructed of a transparent material which would allow visual confirmation that the backwashing process is taking place. All connections of inlet screen 53, outlet screen 16, piping 57 and syphon 25 to tank 2 are made with conventional fittings. This allows convenient maintenance, cleaning, or replacement of damaged sections as may become necessary. It will be noted that the embodiment of FIG. 10 illustrates how the bioclarifier tank may comprise completely separate containers forming the filter chamber 12 and charge chamber 13, which are then connected by external piping. This is significant since it illustrates the versatility and broad scope of the inventive concept. Any two existing containers could conceivably be employed in order to create a bioclarifier. Nor do the containers need to have common walls or be directly adjacent one another. The containers could be as small as (or smaller than) common milk jugs or as large as (or larger than) underground storage tanks for holding gasoline. As used herein, the term "tank" includes any containment system whether formed of a single container with internal walls defining the charge chamber 13 and filter chamber 12 or formed of separate containers making up the filter chamber 12 and charge chamber 13.

Figure 11B:
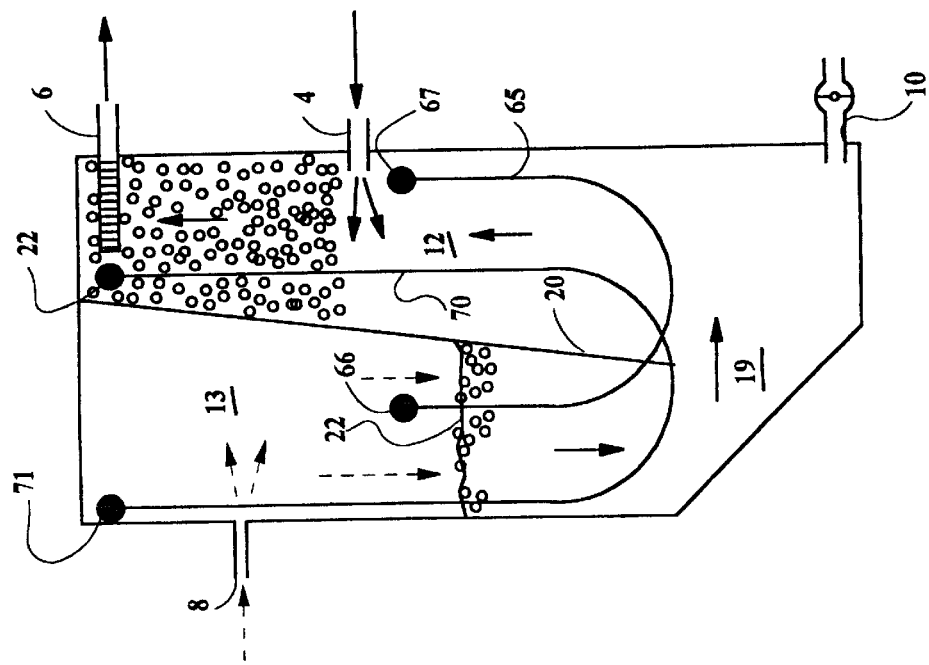
FIGS. 11a–11f illustrate the operation of an embodiment of the present invention which employs a two stage backwash procedure.
Figure 11A:
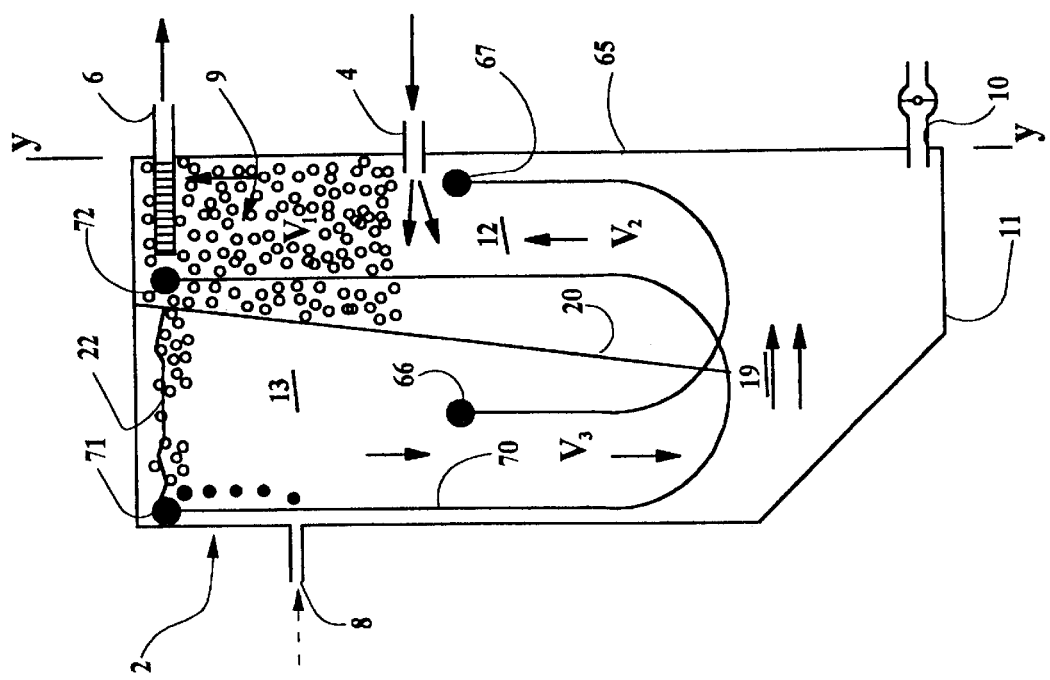
Figure 11D:
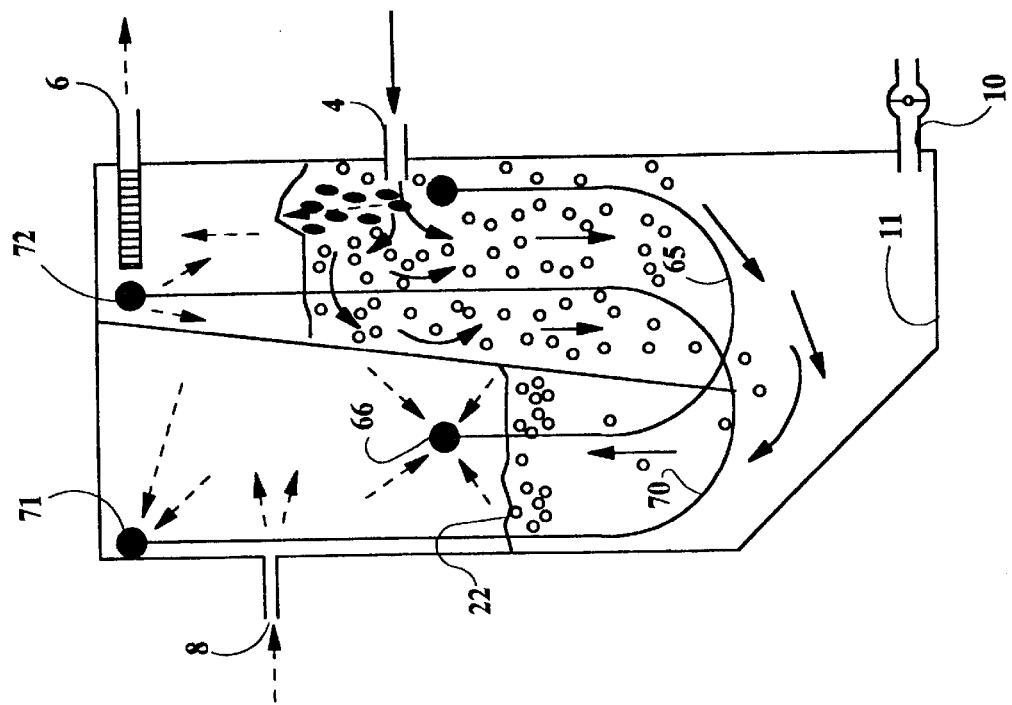

A fourth embodiment of the present invention is shown in FIGS. 11a–11f. In FIG. 11a, tank 2 is divided by wall 20 into a charge chamber 13 and filter chamber 12 which are positioned in a side-by-side configuration. The volume of charge chamber 13 is represented by $V_3$ in FIG. 11a and the volume of the filter media is represented by $V_1$. In a preferred embodiment, $V_3$ may be sized according to the equation:

$$V_3 \cong 2V_1 + Qi(t_{wash})$$

where:

$V_3$ is the charge chamber volume;

$V_1$ is the volume of the filter media bed;

$Qi$ is the flow rate of the influent into the tank; and $t_{wash}$ is the time required for backwashing.

Of course, this equation merely reflects a $V_3$ for a preferred embodiment and many other variations of $V_3$ could be employed with embodiments similar to that shown in FIG. 11a. In order to provide filter chamber 12 with a sloping sidewall like the two previous embodiments of tank 2, wall 20 is slope away from media bed 9 in order to allow easier expansion of the media bed during backwashing. Wall 20 terminates above tank bottom 11 in order to form a passage 19 through which water may pass between filter chamber 12 and charge chamber 13. Influent enters filtration chamber 12 by way of influent inlet 4, is filtered through media bed 9 and exits effluent outlet 6.

Figure 11C:
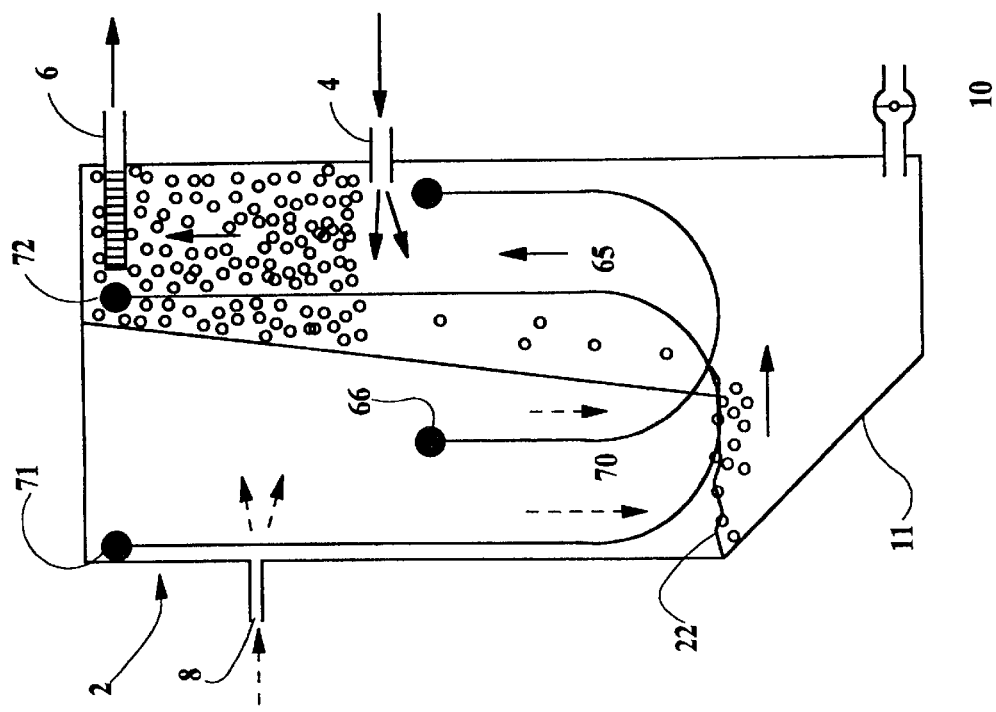

However, the backwashing process of the FIG. 11a embodiment differs from the previous embodiments in that there will be two syphons operating during the backwash stage. A fast syphon 65 is shown with air outlet 67 and air inlet 66 positioned at a height approximate to the midlevel of filter chamber 12 and charge chamber 13. A slow syphon 70 is shown with an air outlet 72 and air inlet 71. While not shown, it will be understood that these inlets and outlets may be covered with screens as the particular application dictates. The designation of syphon 65 as a "fast" syphon is reference to the fact that fast syphon 65 is of a comparatively larger diameter than slow syphon 70 and therefore allows air to flow through it at a much faster rate. In operation, FIG. 11b illustrates how air will enter charge chamber 13 through inlet 8 and slowly lower water level 22 as in the previous embodiments. Water level 22 will eventually approach near the bottom of wall 20 which is only marginally lower than the bottommost sections of fast syphon 65 and slow syphon 70 as shown in FIG. 11c. FIG. 11c illustrates how a group of filter media pellets may accumulate in charge chamber 13 as the embodiment shown has no screen across passage 19. If the syphons are properly adjusted such that water level 22 falls close to, but not actually below the bottom of wall 20 before syphon 25 triggers; and if there is a layer of filter media 15 several pellets thick in charge chamber 13, then the weight of the overlying pellets will tend to push the lower pellets under wall 20 where they can rise to the media bed 9 in filter chamber 12 before commencement of the backwashing stage. In this manner, even without a screen across channel 19, there is never a loss of a significant number of pellets from filter chamber 12, while simultaneously the head losses associated with screens is eliminated. In this embodiment, syphon 65 and 70 act as air outlets between filter chamber 12 and charge chamber 13.

Figure 11F:
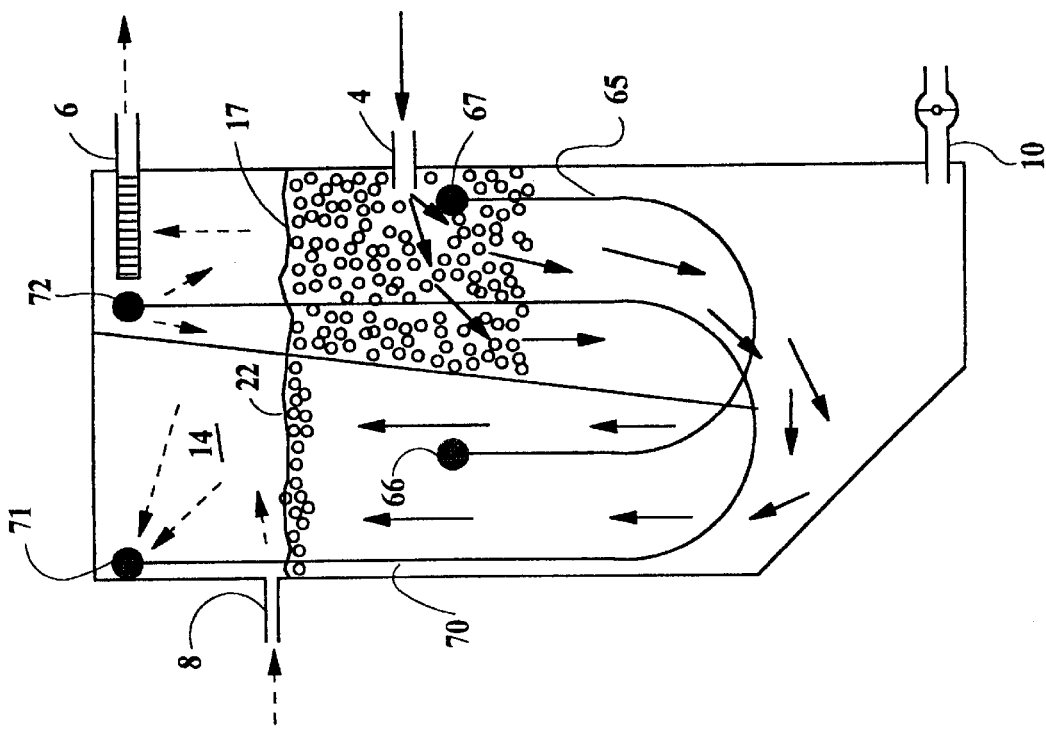
Figure 11E:
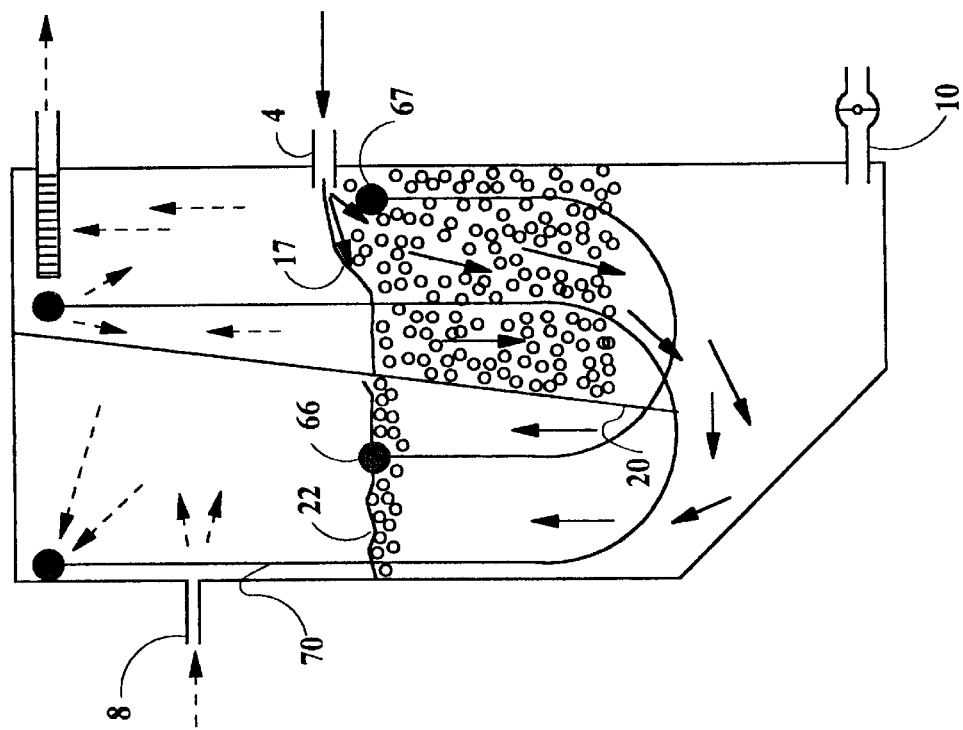

As with the previous embodiments, prior to water level 22 falling below wall 20, air pressure in charge chamber 13 will overcome the resisting pressure of the water column in the filter chamber side of syphons 65 and 70. Fast syphon 65 then allows the air in charge chamber 13 to rapidly escape into filter chamber 12 and vigorously agitate the pellets of filter media 15 as filter media 15 drops with the water level in filter chamber 12 (see FIG. 11d). As the backwashing process continues, water level 22 in charge chamber 13 will rise until water enters air inlet 66 and discontinues the transfer of air through fast syphon 65. The filling of fast syphon 65 with water stops the rapid rise of water level 22 in charge chamber 13 and will allow the water level 17 to begin to rise in filter chamber 12. FIG. 11e illustrates how filter chamber 12 will be of sufficient size to allow the entire media bed 9 to fall below inlet 4 and yet still remain above the bottom edge of wall 20. This allows the influent to initially wash over media bed 9 and help induce solids intermingled with the media pellets to move downward. The continued downward flow of influent during the rising of media bed 9 is assisted by slow syphon 70. As water levels 17 and 22 continue rising past inlet 66 and outlet 67 of fast syphon 65, air will continue to be transferred, albeit at a significantly slower rate, from charge chamber 13 to filter chamber 12 through slow syphon 70 as seen in FIG. 11f. Because air is escaping from air pocket 14 as water level 22 rises, there is not a substantial build up of back pressure in air pocket 14. This in effect allows the entering influent to cause water level 17 to be incrementally higher than water level 22 and creates a differential pressure between charge chamber 13 and filter chamber 12 for the entire period charge chamber 13 is filling with water. This slightly lower pressure in charge chamber 13 will induce influent entering filter chamber 12 to flow downwards while media bed 9 rises toward the top of filter chamber 12. This downward flow of influent continues to carry lose solids away from media bed 9 and towards the bottom of tank 2. Another advantage of the slower refilling of filter chamber 12 by slow syphon 70 is realized when employing multiple media pellet beds. The slower refilling allows the pellets to become arranged in the media pack in the order of most buoyant to the least buoyant. This insures proper graduation of the media bed and thus more efficient filtration.

While the embodiment of the bioclarifer 1 shown in FIG. 1 is superior to the prior art in reducing blow down turbidity, it still allows a certain amount of fresh influent and solids intermingled with the media pellets to rise to effluent outlet 6 simultaneously with the rising media bed. This allows some unfiltered effluent and solids to leave the filter chamber without flowing through a sufficient depth of media bed 9 needed to remove the solids and reduce the turbidity of that effluent. While this small amount of unfiltered water is generally not biologically significant to the overall performance of the bioclarifer, a brief cloud of "dirty" water may be aesthetically undesirable in environments such as aquariums and swimming pools. Because the biofilter shown in FIGS. 11a–11f induces influent flow downward until media bed 9 is at or near the top of filter chamber 12, the media bed tends to remain more segregated from the influent until media bed 9 reaches the top of filter chamber 12. Therefore, the first influent flowing through media bed 9 after termination of the backwash stage must flow through a substantial portion of media bed 9. This insures that the blow down turbidity is kept within the lowest limits possible.

Finally, while many parts of the present invention have been described in terms of specific embodiments, it is anticipated that still further alterations and modifications thereof will no doubt become apparent to those skilled in the art. For example, the tank of FIG. 11a could be employed with only fast syphon 65 and omit slow syphon 70. In another example, tank 2 could be formed by rotating the tank of FIG. 11a around the axis y—y. This would form a tank having a central filter chamber 12 and an annular charge chamber 13. Nothing in the specification should be considered a size limitation on how large or small the biofilter may be. It is envisioned that filters having much less than 1 ft$^3$ of filter media could be used to filter aquariums while filters having well over 100 ft$^3$ or even many times that amount of filter media could be employed in industrial or domestic wastewater applications. Nor should the specific embodiments be interpreted as a limitation on the geometric configuration of the biofilter. The present invention could take on any number of widely differing geometric configurations as illustrated by the differences between the embodiments of FIGS. 1 and 11a. It is therefore intended that the following claims be interpreted as covering all such alterations and modifications as fall within the true spirit and scope of the invention.

I claim:

1. A tank for a floating media biofilter comprising:
   a. a filter chamber;
   b. a charge chamber for intermittently storing air, said charge chamber being fluidly connected to said filter chamber and having:
      i. an air outlet for admitting air into said filter chamber;
      ii. an air inlet; and
   c. a trigger for selectively allowing the passage of air through said air outlet.

2. A tank according to claim 1, wherein said charge chamber has a wall separating said charge chamber from said filter chamber and said air outlet communicates between said charge chamber and said filter chamber.

3. A tank according to claim 2, wherein said wall forms a substantially air tight boundary between said charge chamber and said filter chamber.

4. A tank according to claim 2, wherein said filter chamber is fluidly connected to said charge chamber by a water inlet passage formed in said wall below said air outlet in order to allow water to flow from said filter chamber into said charge chamber.

5. A tank according to claim 1, wherein said trigger comprises a syphon with a first opening communicating with said air outlet and a second opening communicating with an interior space of said charge chamber.

6. A tank according to claim 5, wherein said first opening comprises a dual discharge outlet.

7. A tank according to claim 5, wherein said second opening comprises an inverted cone shaped section.

8. A tank according to claim 1, wherein said trigger comprises a mechanical seal engagable with said air outlet and a float connected to said mechanical seal.

9. A tank according to claim 8, wherein said mechanical seal and said float are positioned on a support and said support further has a counter weight positioned thereon.

10. A tank according to claim 9, wherein said counter weight is a neutrally buoyant counter weight sized so that its emerged weight is sufficient to overcome a retaining force between said air outlet and said mechanical seal.

11. A tank according to claim 1, wherein said filter chamber includes a bed of floating filter media.

12. A tank according to claim 11, further having an influent line and an effluent line connected thereto.

13. A tank according to claim 12, further having a sludge removal line connected thereto, an air pump connected to said air inlet, and a settling area communicating between said filter chamber and said charge chamber.

14. A tank according to claim 1, wherein a sludge storage basin is formed below said charge chamber.

15. A tank according to claim 14, wherein said sludge storage basin is formed in a conical shape.

16. A containment system for a floating media biofilter comprising:
   a. a filter chamber;
   b. a charge chamber for intermittently storing gas, said charge chamber being fluidly connected to said filter chamber and having:
      i. a gas inlet; and
   c. a trigger for selectively allowing the passage of gas from said charge chamber to said filter chamber.

17. A containment system according to claim 16, wherein said containment system includes a first and second trigger wherein said first trigger discharges gas at a faster rate than said second trigger.

18. A containment system according to claim 17, wherein said first and second triggers are first and second syphons and said first syphon has a larger diameter than said second syphon.

19. A containment system according to claim 16, wherein said charge chamber and said filter chamber are positioned in a side by side configuration.

20. A containment system according to claim 16, wherein said filter chamber and said charge chamber comprise separate containers.

21. A containment system according to claim 20, wherein said containers are connected by a trigger device.

22. A containment system according to claim 20, wherein a settling area interconnects said charge chamber and said filter chamber.

23. A method of backwashing the filter media in a floating media biofilter having a filter chamber with waste water flowing therethrough, a charge chamber, and a trigger for selectively allowing the transfer of air between said filter chamber and said charge chamber, said method comprising the steps of:
   a. introducing air into said charge chamber while said trigger does not allow any substantial transfer of air between said filter chamber and said charge chamber;
   b. activating said trigger to allow air to flow from said charge chamber to said filter chamber at a rate sufficient to agitate said floating media; and
   c. deactivating said trigger to prevent any substantial transfer of air between said charge chamber and said filter chamber.

24. A method according to claim 23 wherein a time period between successive backwash cycles is controlled by the rate air is introduced into said charge chamber.

25. A method according to claim 24, wherein said time period between backwashing cycles is long enough to allow substantial settling of solids entrained in said waste water during a backwash cycle.

26. A method according to claim 23, wherein a substantial portion of the waste water in said filter chamber flows into said charge chamber during a backwash cycle.

* * * * *